3,810,868
Patented May 14, 1974

3,810,868
DIMETHYLTIN MERCAPTO ESTER STABILIZERS
FOR HALOGENATED RESINS
Lewis B. Weisfeld, Princeton, N.J., and Robert C. Witman, Cincinnati, Ohio, assignors to Cincinnati Milacron Chemicals, Inc., Reading, Ohio
No Drawing. Continuation-in-part of application Ser. No. 177,516, Sept. 2, 1971. This application Dec. 21, 1972, Ser. No. 317,228
Int. Cl. C08f 45/62
U.S. Cl. 260—45.75 K    18 Claims

ABSTRACT OF THE DISCLOSURE

Dimethyltin derivatives of lower toxicity are prepared by reducing the amount of trimethyltin impurity.

---

The present application is a continuation-in-part of application 177,516, filed Sept. 2, 1971.

The present invention relates to dimethyltin compounds of reduced toxicity and their use as stabilizers for halogen containing resins.

According to the present invention there are prepared dimethyltin compounds having the formula

where $R_1$ and $R_2$ are —$S(CH_2)_nCOOR_3$,

—$S(CH_2)_nCOOR'OCO(CH_2)_nS$—

—$OR_4$, —$SR_4$, —OCOCH=CHCOOR_5$, $OCOR_6$, chlorine or $R_1$ and $R_2$ together are either S or O. In the formula $R_3$, $R_4$, $R_5$ and $R_6$ are hydrocarbon or divalent sulfur (thioether) substituted hydrocarbon or oxygen (ether) substituted hydrocarbon, e.g. alkyl, cycloalkyl, alkenyl, benzyl, tolyl, phenyl, of up to 20 carbon atoms, preferably 4 to 12 carbon atoms, $n$ is an integer of 1 to 3 and R' is a divalent hydrocarbon (alkylene), chlorine substituted divalent hydrocarbon, divalent sulfur (thioether) or oxygen (ether) substituted hydrocarbon of 2 to 6 carbon atoms.

Typical compounds of this type are shown in Mack Pat. 2,684,973, Langkammerer Pat. 2,253,128, Quattlebaum Pat. 2,307,157, Leistner Pat. 2,641,596, Leistner Pat. 2,-726,254, Best Pat. 2,731,484, Weinberg Pat. 2,746,946, Mack Pat. 2,809,956. Weinberg Pat. 2,832,750. The entire disclosure of both Mack patents, Langkammerer, Quattlebaum, both Leistner patents, Best and both Weinberg patents is hereby incorporated by reference.

Among the compounds of reduced toxicity prepared according to the invention are dimethyltin dichloride,
dimethyltin oxide,
dimethyltin sulfide,
dimethyltin bis(isooctyl thioglycolate),
dimethyltin bis(isooctyl-3-mercaptopropionate),
dimethyltin bis(2-ethylhexylthioglycolate),
dimethyltin bis(2'-ethylhexyl-3-mercaptopropionate),
dimethyltin bis(isooctyl 4-mercaptobutyrate),
dimethyltin bis(n-octyl thioglycolate),
dimethyltin bis(n-octyl-3-mercaptopropionate),
dimethyltin bis(methyl thioglycolate),
dimethyltin bis(methyl 3-mercaptopropionate),
dimethyltin bis(methyl 4-mercaptobutyrate),
dimethyltin bis(ethylthioglycolate),
dimethyltin bis(propyl 3-thiopropionate),
dimethyltin bis(butyl thioglycolate),
dimethyltin bis(butyl 3-thiopropionate),
dimethyltin bis(butyl-4-thiobutyrate),
dimethyltin bis(isooctyl 2-thiopropionate),
dimethyltin bis(decyl thioglycolate),
dimethyltin bis(dodecyl thioglycolate),
dimethyltin bis(dodecyl 3-thiopropionate),
dimethyltin bis(dodecyl 4-thiobutyrate),
dimethyltin bis(octadecyl thioglycolate),
dimethyltin bis(octadecyl 3-thiopropionate),
dimethyltin bis(octadecyl 4-thiobutyrate),
dimethyltin bis(eicosanyl thioglycolate),
dimethyltin bis(eicosanyl-3-thiopropionate),
dimethyltin bis(cyclopentyl thioglycolate),
dimethyltin bis(cyclohexyl thioglycolate),
dimethyltin bis(cyclohexyl-3-thiopropionate),
dimethyltin bis(benzyl thioglycolate),
dimethyltin bis(benzyl-3-thiopropionate),
dimethyltin bis(phenyl thioglycolate),
dimethyltin bis(p-tolyl-3-thiopropionate),
dimethyltin bis(allyl thioglycolate),
dimethyltin bis(allyl-3-thiopropionate),
dimethyltin bis(allyl-4-thiobutyrate),
dimethyltin bis(crotyl thioglycolate),
dimethyltin bis(oleyl thioglycolate),
dimethyltin bis(oleyl-3-thiopropionate),
dimethyltin bis(oleyl-4-thiobutyrate),
dimethyltin octyl thioglycolate decyl thioglycolate,
dimethyltin bis(methallyl thioglycolate),
dimethyltin bis(methallyl-3-thiopropionate),
dimethyltin bis(dodecenyl thioglycolate),
dimethyltin dimethoxide,
dimethyltin dibutoxide,
dimethyltin diisooctoxide,
dimethyltin didodecoxide,
dimethyltin dioctadecoxide,
dimethyltin dimethyl mercaptide,
dimethyltin diethyl mercaptide,
dimethyltin dipropyl mercaptide,
dimethyltin dibutylmercaptide,
dimethyltin diisooctylmercaptide,
dimethyltin di(2-ethylhexyl mercaptide),
dimethyltin dioctyl mercaptide,
dimethyltin didodecyl mercaptide,
dimethyltin dioctodecyl mercaptide,
dimethyltin dieicosanyl mercaptide,
dimethyltin diallyl mercaptide,
dimethyltin dioleyl mercaptide,
dimethyltin dicyclohexyl mercaptide,
dimethyltin diphenyl mercaptide,
dimethyltin dibenzyl mercaptide,
dimethyltin diacetate,
dimethyltin dipropionate,
dimethyltin dibutyrate,
dimethyltin divalerate,
dimethyltin dihexanoate,
dimethyltin dioctanoate,
dimethyltin didecanoate,
dimethyltin dilaurate,
dimethyltin dimyristate,
dimethyltin dipalmitate,
dimethyltin distearate,
dimethyltin dieicosanoate,
dimethyltin methoxy acetate,
dimethyltin methoxy oleyl maleate,
dimethyltin butoxy octadecyl maleate,
dimethyltin ethoxy methyl maleate,
dimethyltin propoxy isooctyl maleate,
dimethyltin di(methylmaleate),
dimethyltin di(ethylmaleate),
dimethyltin di(propylmaleate),
dimethyltin di(butylmaleate),
dimethyltin di(octylmaleate),
dimethyltin di(isooctyl maleate),
dimethyltin di(2-ethylhexyl maleate), dimethyltin di(benzyl maleate),
dimethyltin di(dodecyl maleate),
dimethyltin di(octadecyl maleate),
dimethyltin di(phenyl maleate),
dimethyltin di(oleyl maleate),
dimethyltin di(allyl maleate),
dimethyltin diacrylate,
dimethyltin dimethacrylate,
dimethyltin dicrotonate,
dimethyltin ethylene bis thioglycolate (the reaction product of dimethyltin dichloride with ethylene bis thioglycolate of the formula $HSCH_2COOCH_2CH_2OOCCH_2SH$)

dimethyltin propylene bis(thioglycolate),
dimethyltin trimethylene bis(thioglycolate),
dimethyltin hexamethylene bis(thioglycolate),
dimethyltin ethylene bis(3-thiopropionate),
dimethyltin diethyleneglycol bis(thioglycolate),
dimethyltin thiodiglycol bis(thioglycolate).

The products containing divalent groups such as $$-S(CH_2)_nCOOR'OCO(CH_2)_nS-$$

preferably are prepared using chain stoppers such as $-S(CH_2)_nCOOR_3$ in proportions to give small polymers.

Other compounds within Formula I include dimethyltin bis(2-chloroethyl thioglycolate),
dimethyltin bis(3-chloropropyl thioglycolate),
dimethyltin bis(2'-chloroethyl-3-thiopropionate),
dimethyltin bis(methoxyethyl thioglycolate),
dimethyltin bis(methoxypropyl thioglycolate),
dimethyltin bis(ethoxyethyl-3-thiopropionate),
dimethyltin bis(butoxyethyl thioglycolate),
dimethyltin bis(ethoxyethoxy ethyl thioglycolate),
dimethyltin bis(methylthioethyl thioglycolate),
dimethyltin bis(methylthioethyl mercaptide).

While many organotin compounds have been proposed as stabilizers for polyvinyl chloride (PVC), e.g., see Weinberg Pat. 2,648,650, Leistner Pat. 2,641,596, Kauder Pat. 3,222,317 and Hechenbleikner Pat. 3,396,185, from their inception the organotin stabilizers employed commercially have all been butyltin products except for the use of octyltin stabilizers for food contact articles. The most important organotin stabilizer is dibutyltin bis(isooctyl thioglycolate) available commercially under the trademark Advastab TM-180. While many tin stabilizer patents since about 1950 have included R group of 1 to 8 or more carbon atoms attached to the tin, only butyls and to a lesser extent octyls have in fact been used commercially. The propyl tins are known to have an obnoxious odor, ethyl tin compounds are toxic. Methyltin compounds have been considered water soluble, insufficiently compatible with polyvinyl chloride and to have toxicity problems, particularly as skin irritants.

Historically the largest producer of organotin compounds in the United States is M&T Chemicals, Inc. In a "Symposium on Polyvinylchloride Stabilization Status and Trends" presented at the 160th Americal Chemical Society meeting in Chicago, Ill., in the fall of 1970 a nine-page paper was presented by A. J. Ejk and W. A. Larken of M&T Chemicals, Inc. on "Organotin Stabilization." This article states on p. 2 that tetravalent butyltin compounds are of prime importance as organotin stabilizers and points out defects in all other alkyltin compounds. Thus it states that methyltin compounds are soluble in water. Among the more useful organotin stabilizers is listed dibutyltin S,S' bis(isooctyl mercapto acetate). The article further points out that organotin compounds are frequently used in synergistic mixtures which include various mercaptides and carboxylates as well as zinc soaps (e.g. zinc stearate), phosphites (e.g. triphenyl phosphite), epoxies (e.g. epoxidized soya bean oil), glycerides, UV absorbers and/or antioxidants. Ejk et al. classify tin stabilizers for polyvinyl chloride (PVC) as normal (tin content 16-18%), high (tin content 23-25%) and low (tin content 7-8%) efficiency stabilizers. Normal are preferred, high efficiency stabilizers presenting a dispersibility problem because of their low use. It will be observed that dimethyltin bis(isooctyl thioglycolate) has a tin content of 21.4% and dimethyltin bis(isooctyl mercaptopropionate) has a tin content of 20.4%.

Ejk et al. also show that di(n-octyl) tin S,S' bis(isooctyl mercapto acetate) is a commercial stabilizer. The octyltin compounds are stated to be somewhat lower in tin content and to offer increased lubricity compared to their butyltin counterparts. Ejk et al. state that butyltin stabilizers possess unsurpassed stability to PVC homopolymers and copolymers while only octyltin stabilizers provide the stability, clarity and blush resistance properties required for PVC food packaging. Ejk et al. also point out that "an extended production run is the only true test for a stabilizer but that laboratory tests can be used to evaluate candidates and keep the number of production runs at a minimum."

Dynamic mill stability is among the most popular methods for evaluating the dynamic activity of a stabilizer. The water solubility of methyltin compounds is shown for example in Mack et al. Pat. 2,914,506, Example 10 wherein dimethyltin, S,S' bis(2,3-dihydroxypropyl mercaptide) is shown to be completely water soluble while the corresponding dibutyltin compound is not water soluble. Dimethyltin dichloride is also known to be water soluble.

Barnes and Stoner in British Journal of Industrial Medicine, vol. 15, pp. 15-22 (1958) report on the "Toxic Properties of Some Dialkyltin and Trialkyltin Salts." The article indicates that dimethyltin dichloride, while less toxic than other dialkyltin dichlorides when injected intravenously into rats, when tested on the skin produced severe superficial damage in rats and guinea pigs. Orally it was toxic in a dosage of 160 mg./kg. Barnes and Stoner also pointed out that dibutyltin di-isooctyl thioglycolate had no significant toxic differences from dibutyltin dichloride when applied orally. Trimethyltin acetate had an oral toxicity 40 times greater than that of tributyltin acetate. The trimethyl compound also was water soluble.

Barnes (co-author of the above article) and Magos Organometal. Chem. Rev., vol. 3, pp. 137-150, "Toxicology of Organometallic Compounds" on pp. 143-145 discusses dialkyl and trialkyltin compounds. The article points out on p. 144 that the higher homologues, dibutyl and dioctyltin salts are important stabilizers in PVC and that the lower dialkyltin compounds are intense and acute irritants and damage the skin. In contrast dibutyltin salts are stated to be not sufficiently irritating to produce skin damage. From animal studies it is stated that it would seem probable that dimethyltin salts would damage human skins.

On p. 145 it is pointed out that triethyltin compounds are toxic by mouth or by injection and that trimethyltin compounds are similarly toxic while tributyltin compounds are indicated as having a lower toxicity.

Kirk-Othmer Encyclopedia of Chemical Technology, 1st ed., second supplement (1960), on p. 541 points out that dimethyltin dichloride derivatives are not too compatible with polyvinyl chloride and hazy films result.

TM-180 is a commercial dibutyltin bis(isooctylthioglycolate). TM-181 is commercial dimethyltin bis(isooctyl thioglycolate) of the present invention.

Acute oral toxicity and primary skin and acute eye irritation studies were made on TM-180 and TM-181 using the techniques specified in the Regulations for the Enforcement of the Federal Hazardous Substances Act (revised, Federal Register, Sept. 17, 1964). Oral toxicity ($LD_{50}$) for TM-180 was 1037 mg./kg. and TM-181 had an oral $LD_{50}$ of 1102 mg./kg. In the Patch Test For Primary Skin Irritation TM-180 had a Primary Irritation Index of 6.99 while TM-181 had a Primary Irritation Index of 2.36.

Eye application of TM-180 to rabbits produced moderate or marked conjunctivitis and thickening and fissuring of the eyelids in each rabbit tested while with TM-181 there was no irritative effects involving the cornea, iris or conjunctival.

The summary of the report on TM-180 classified TM-180 "astoxic, but not highly toxic, by ingestion; is a primary skin irritant, but not a corrosive material; and is an eye irritant" while TM-181 is classified "as toxic, but not highly toxic, by ingestion; is not a primary skin irritant or corrosive material; and is not an eye irritant."

The lack of skin irritation is surprising in view of the Barnes and Stoner results set forth in Table 5 in regard to dimethyltin dichloride.

In water solubility tests both TM-180 and TM-181 proved to be quite insoluble, the solubility being about 0.025% for both compounds. Water extraction tests on polyvinyl chloride pipe containing TM-180 and TM-181 were conducted according to the National Sanitation Foundation (N.S.F.) tests at the indicated stabilizer levels in parts per hundred resin (phr.).

| Compound | Phr. | 72 hr. 100° F. distilled H₂O parts per million (p.p.m.) stabilizer extracted |
|---|---|---|
| TM-180 | 0.6 | 3 |
| TM-181 | 0.54 | 1 |

Further extractions were carried out with PVC pipe compound at various levels of the stabilizer. In all cases extractions in the one part per million range were obtained.

| Compound | Phr. | 72 hr. 100° F. distilled water p.p.m. stabilizer extracted | |
|---|---|---|---|
| | | A | B |
| TM-180 | 2.0 | 1.1 | 0.9 |
|  | 1.2 | 0.5 | 0.7 |
|  | 0.6 | 0.6 | 0.8 |
| TM-181 | 2.0 | 0.8 | 0.5 |
|  | 1.2 | 0.6 | 0.8 |
|  | 0.6 | 0.5 | 0.5 |

TM-181 is thus non-extractable by water from rigid PVC (less than 1 p.p.m.) and has been approved by the National Sanitation Foundation for use in potable water pipe. Previously the dibutyltin analogue was the sole approved tin stabilizer for such use. The suitability of the dimethyltin bis(isooctyl thioglycolate) for such purpose is particularly surprising in view of the belief that dimethyltin compounds in general are water soluble.

While TM-181 is slightly more volatile than TM-180 (about 20-25° C.) on thermogravimetric analysis (complete loss for TM-181 for 3 samples average 279° C. and for TM-180 averaging 301° C. while the temperature at which 50% of the material was gone for TM-181 was 223° C. and for TM-180 was 245° C.) this is not observable in actual use. Thus in Brabender experiments with PVC at variable and high concentrations at elevated temperatures (440° F.), no loss in stabilization with TM-181 was noted and if there is any difference in loss of stabilization with TM-181 over TM-180 in PVC processing, it is not apparently significant.

To reduce toxicity of formulations containing dimethyltin bis(isooctyl thioglycolate) it should be as free as possible from trimethyltin isooctyl thioglycolate. The oral toxicity of a sample of an alkyltin compound can be determined relatively accurately by the equation $$M = \frac{TD}{C_t(D-T)+T}$$

where $D = LD_{50}$ of the dialkyltin compound in mg./kg. body weight $T = LD_{50}$ of the trialkyltin compound in mg./kg. body weight $M = LD_{50}$ of the binary mixture, mg./kg. of body weight and $C_t$ = decimal concentration of the trialkyltin compound in the binary compound.

Using D for dimethyltin bis(isooctyl thioglycolate) of 1380 and T for trimethyltin isooctyl thioglycolate of 24 (both values determined experimentally) the following results are obtained by the equation and compared with actual oral toxicity results.

| $C_t$ | 0 | .005 | .010 | .015 | .020 | .030 | .050 | .100 | 1.0 |
|---|---|---|---|---|---|---|---|---|---|
| M (calc.) | 1,380 | 1,076 | 882 | 747 | 648 | 512 | 361 | 208 | 24 |
| M (exp.) | 1,380 | 1,020 | | | 695 | | 376 | | 24 |

It has been found that dimethyltin bis(isooctyl thioglycolate) is an exceptionally good stabilizer for vinyl chloride polymers, much better than dibutyltin bis(isooctyl thioglycolate). In laboratory tests the superiority is not as marked as in production sized extruders where it seems on a practical basis to be up to twice as effective, pound for pound. The ability of TM-181 to maintain good "early color" in PVC unmatched by TM-180 at any concentration. In the first 7 months since its commercial introduction over 200,000 pounds of TM-181 have been sold and it is rapidly gaining widespread acceptance.

In at least one case a customer reported that TM-181 as a stabilizer resulted in fusion of rigid PVC much more quickly than with TM-180. Possibly this is due to TM-181 being more solvating or more plasticizing than TM-180 at elevated temperatures such as those occurring in extruders and other processing equipment.

TM-181 is described in its commercial literature as a liquid organotin, sulfur-containing PVC stabilizer possessing excellent compatibility and processing characteristics. It is essentially non-lubricating. TM-181 furnishes equivalent performance to TM-180 with much greater economy.

Typical physical properties:
  Form _____ Clear liquid.
  Color (Gardner) _____ 2-3.
  Specific gravity at 75° F. _____ 1.19.
  Viscosity at 75° F. _____ 66 cps.
  Lbs./gallon _____ 9.9.

(TM-181 also has an $LD_{50}$ of over 1000 mg./kg.)

APPLICATION AND ATTRIBUTES OF TM-181

(1) Designed for the rigors of rigid PVC processing: single and twin screw extrusion, injection molding, blow molding, and calendering.

(2) Especially recommended as a more economical, yet equivaent performing replacement for TM-180 and other comparable products in such PVC extrusion applications as NSF and DWV pipe (Types I and II), electrical conduit, sheet and siding.

(3) Furnishes superior static and dynamic (Brabender) stability to TM-180 and also promotes better initial color in PVC at use levels 10-20% lower than TM-180.

(4) High compatibility with PVC promotes excellent clarity—recommended for blow molding.

(5) Enhances fusion of PVC powder blends; contributes to lower melt viscosity.

(6) Recommended for solution vinyl chloride systems containing reactive "terpolymers," e.g. vinyl chloride-vinyl acetate-maleic anhydride terpolymers such as 86:13:1, 85:13:2, 84:13:3.

(7) Recommended for fluidized-bed powder coating applications.

While the use of dimethyltin bis(isooctyl thioglycolate) is preferred in the stabilizer compositions there can also be used dimethyltin bis(isooctyl mercaptopropionate).

Unless otherwise indicated all parts and percentages are by weight.

The stabilizers of the present invention can be used with halogen containing vinyl and vinylidene resins in which the halogen is attached directly to the carbon atoms. Preferably, the resin is a vinyl halide resin, specifically, a vinyl chloride resin. Usually, the vinyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenically unsaturated compound copolymerizable therewith contains at least 10% of polymerized vinyl chloride.

As the halogen resin there can be employed chlorinated polyethylene having 14 to 75%, e.g. 27% chlorine by weight, polyvinyl chloride, polyvinylidene chloride, polyvinyl bromide, polyvinyl fluoride, polyvinylidene fluoride, copolymers of vinyl chloride with 1 to 90%, preferably, 1 to 30%, of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, chloroacrylonitrile, allylidene diacetate and chloroallylidene diacetate. Typical copolymers include vinyl chloride-vinyl acetate (96.4 sold commercially as VYNW), vinyl chloride-vinylacetate (87:13), vinyl chloride-vinyl acetate - maleic anhydride (86:13:1), vinyl chloride-vinylidene chloride (95:5), vinyl chloride-diethyl fumarate (95:5), vinyl chloride-trichloroethylene (95:5), vinyl chloride-2-ethylhexyl acrylate (80:20).

The stabilizers of the present invention can be incorporated with the resin by admixing in an appropriate mill or mixer or by any of the other well-known methods which provide for uniform distribution throughout the resin compositions. Thus, mixing can be accomplished by milling on rolls at 100–160° C.

In addition to the novel stabilizers there can also be incorporated with the resin conventional additives such as plasticizers, pigments, fillers, dyes, ultraviolet light absorbing agents, densifying agents and the like.

If a plasticizer is employed, it is used in conventional amount, e.g. 30 to 150 parts per 100 parts of resin. Typical plasticizers are di-2-ethylhexyl phthalate, dibutyl sebacate, dioctyl sebacate, tricresyl phosphate.

The tin containing stabilizers are normally used in an amount of 0.01 to 10% by weight of the resin, more preferably 0.1 to 5% of the tin compound is used by weight of the resin.

There can also be included with the novel stabilizers of the present invention conventional stabilizers and antioxidants to assist in improving the properties of the halogen containing resin. Thus there can be included 0.01–10%, preferably 0.1–5% based on the resin of sulfur containing compounds such as dilauryl-thiodipropionate, distearyl 3,3'-thiodipropionate, dicyclohexyl - 3,3' - thiodipropionate, dicetyl - 3,3' - thiodipropionate, dioleyl-3,3'-thiodipropionate, dibenzyl - 3,3' - thiodipropionate, di-p-methoxyphenyl-3,3'-thiodipropionate, didecyl - 3,3' - thiodipropionate, dibenzyl-3,3'-thiodipropionate, diethyl-3,3'-thiopropionate, lauryl ester of 3-methylmercaptopropionic acid, lauryl ester of 3-butylmercaptopropionic acid, lauryl ester of 3-lauryl mercaptopropionic acid, phenyl ester of 3-octyl mercaptopropionic acid.

There can also be included 0.1–10%, preferably 0.1–5% by weight of the halogen containing resin of metal salt stabilizers such as Groups I and II metal soaps, e.g. calcium stearate, calcium 2-ethylhexoate, calcium octoate, calcium oleate, calcium ricinoleate, calcium myristate, calcium palmitate, calcium laurate, barium laurate, barium stearate, magnesium stearate, zinc stearate, cadmium laurate, cadmium octoate, cadmium stearate and sodium stearate. Other metal salts can be used as lead stearate, lead silicate, aluminum stearate, etc.

There can also be added phenolic antioxidants in an amount of 0.01–10%, preferably 0.1–5%. Examples of such phenols include 2,6-di-t-butyl-p-cresol,
butylated hydroxyanisole,
propyl gallate,
4,4'-thiobis(6-t-butyl-m-cresol),
4,4'-cyclohexylidene diphenol,
2,5-di-t-amyl hydroquinone,
4,4'-butylidene bis(6-t-butyl-m-cresol),
hydroquinone monobenzyl ether,
2,2'-methylene-bis(4-methyl-6-t-butyl phenol),
2,6-butyl-4-decyloxy phenol,
2-t-butyl-4-dodecyloxy phenol,
2-t-butyl-4-dodecyloxy phenol,
2-t-butyl-4-octadecyloxy phenol,
4,4'-methylene-bis(2,6-di-t-butyl phenol),
p-amino phenol,
N-lauryloxy-p-amino phenol,
4,4'-thiobis(3-methyl-6-t-butyl phenol),
bis[o-(1,1,3,3-tetramethyl butyl)phenol] sulfide,
4-acetyl-β-resorcylic acid,
A stage p-t-butylphenolformaldehyde resin,
4-dodecyloxy-2-hydroxybenzophenone,
3-hydroxy-4-(phenylcarbonyl) phenyl palmitate,
n-dodecyl ester of 3-hydroxy-4-(phenyl carbonyl) phenoxyacetic acid, and
t-butyl phenol.

The use of epoxy compounds in an amount of 0.01–5% in the polymer compositions is also valuable. Examples of such epoxy compounds include epoxidized soya bean oil, epoxidized lard oil, epoxidized olive oil, epoxidized linseed oil, epoxidized caster oil, epoxidized peanut oil, epoxidized corn oil, epoxidized tung oil, epoxidized cottonseed oil, epichlorhydrinbisphenol A resins (epichlorhydrindiphenylolpropane resins), phenoxy-propylene oxide, butoxypropylene oxide, epoxidized neopentylene oleate, glycidyl epoxystearate, epoxidized α-olefins, epoxidized glycidyl soyate, dicyclopentadiene, dioxide, epoxidized butyl tollate, styrene oxide, dipentene dioxide, glycidol, vinyl cyclohexene dioxide, glycidyl ether of resorcinol, glycidol ether of hydroquinone, glycidyl ether of 1,5-dihydroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate.

Likewise there can be used organic phosphites in an amount of 0.01 to 10%, preferably 0.1–5% of the halogen containing resins.

The organic phosphites contain one or more, up to a total of three, aryl, alkyl, aralkyl and alkaryl groups, in any combination. The term "trialkylaryl" is inclusive of alkyl, aryl, alkaryl and aralkyl phosphites containing any assortment of alkyl, aryl, alkaryl and aralkyl groups. Exemplary are triphenyl phosphite, tricesyl phosphite, tri (dimethylphenyl) phosphite, tributyl phosphite, triocetyl phosphite, tridoecyl phosphite, octyl diphenyl phosphite, dioctyl phenyl phosphite, tri(octylphenyl) posphite, tri(nonylphenyl) phosphite, tribenzyl phosphite, butyl, dicresyl phosphite, octyl di(ocetylphenyl) phosphite, tri(2-ethyl-hexyl) phosphite, tritolyl phosphite, tri(2 - cycloexylphenyl) phosphite, tri-alpha-naphthyl phosphite, tri (phenylphenyl) phosphite, and tri(2-phenylethyl) phosphite.

Of course there can also be incorporated 0.01–10% of conventional organometallic stabilizers such as the known organotin carboxylates and mercaptides if desired. Such materials include butyltin tris dodecyl mercaptide, dibutyltin dilaurate, dibutyltin didodecyl mercaptide, dianhydro tris dibutylstannane diol, dihydrocarbontin salts of carboxy mercaptals such as those set forth in Hechenbleikner et al. Pat. 3,078,290. There can be included any of the vinyl chloride resin stabilizers set forth in Salyer Pat. 2,985,617.

Likewise there can be included polyol stabilizers for vinyl chloride resins in an amount of 0.01-10%. Thus there can be included glycerol, sorbitol, pentaerythritol and mannitol.

Nitrogen containing stabilizers such as dicyandiamide, melamine, urea, formoguanamine, dimethyl hydantoin, guanidine, thiourea and the like also can be included in amounts of 0.1–10%. There can even be included conventional lubricants for vinyl chloride resins such as low molecular weight polyethylene, i.e. polyethylene wax, fatty acid amides, e.g. lauramide and stearamide, bisamides, e.g. decamethylene, bis amide, and fatty acid esters, e.g. butyl stearate, glyceryl stearate, linseed oil, palm oil, decyl oleate, corn oil, cottonseed oil, hydrogenated cottonseed oil, etc.

DIMETHYLTIN BIS(ISOOCTYLTHIOGLYCOLATE)

Example 1

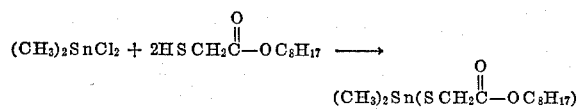

To a mixture of 204.3 parts (1.0 M) of isooctylthioglycolate, 150 parts of water, 84 parts (1.0 M) of sodium bicarbonate and 300 parts of heptane there was added a solution of dimethylthin dichloride, prepared by dissolving 107.5 grams (0.49 M) of dimethyltin dichloride containing 0.5% trimethyltin chloride, in 110 grams of water, over a 1 hour period at 20–30% C. After stirring an additional hour the lower aqueous layer was removed and after washing with 150 grams of water the organic layer was dried and stripped under vacuum to 100° C. The resulting product (dimethyltin bis(isooctylthioglycolate)) consisted of 270 parts (98%) of a colorless oil containing 21% tin, 11.4% sulfur and having a refractive index of 1.5100 and specific gravity of 1.19 at 25° C.

Example 2

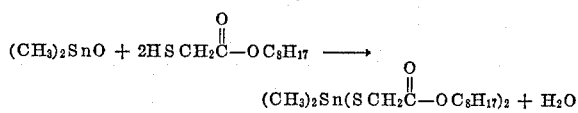

102.2 parts of isooctylthioglycolate (0.5 M) were heated with 41 parts (0.25 M) of dimethyltin oxide (prepared from dimethyltin dichloride containing 0.5% trimethyltin chloride) for 1 hour at 100° C. under vacuum. The yield was 138.5 parts (100%) of dimethyltin bis(isooctyl thioglycolate) with properties similar to those in Examples 1.

DIMETHYLTIN BIS(ISOOCTYL-3-MERCAPTOPROPIONATE)

Example 3

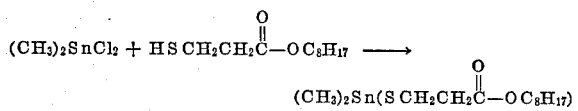

In a 1 liter flask there were placed 218.5 gms. (1.0 M) of isooctyl-3-mercaptopropionate, 200 grams of water, 84 grams (1.0 M) of sodium bicarbonate and 300 grams. of heptane. To this slurry was added a solution of 109.7 grams (0.50 M) of dimethyltin dichloride (containing 0.5% of trimethyltin chloride) in 110 grams over a one hour period. After a short stirring period the organic layer was separated, washed and stripped under vacuum, resulting in a 287 gram yield (99%) of dimethyltin bis(isooctyl - 3-mercaptopropionate), a colorless oil. This compound had a refractive index at 25° of 1.5062, a tin content of 20.3% and a sulfur content of 10.8%.

Example 4

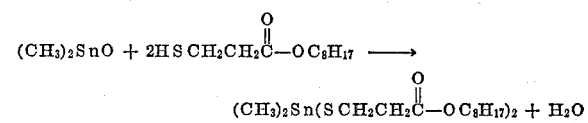

In a ½ liter flask 65.9 grams of dimethyltin oxide (0.40 M) was heated with 174.7 grams (0.80 M) of isooctyl-3-mercaptopropionate for 1 hour at 100° C. under an absolute pressure of 2 mm. of Hg. The colorless oil prepared in this manner was cooled and filtered to yield 232 grams of dimethyltin bis(isooctyl-3-mercaptopropionate).

DISPROPORTIONATION

Example 5

(a)  $(CH_3)_3SnCl + SnCl_4 \rightarrow (CH_3)_2SnCl_2 + CH_3SnCl_3$ (b)  $2(CH_3)_3SnCl + SnCl_4 \rightarrow 3(CH_3)_2SnCl_2$ A sample of dimethyltin dichloride having a trimethyltin content of 5.0% was used to prepare dimethyltin bis-(isooctylthioglycolate) by the method given in Example 1. This product had an $LD_{50}$ value of 380. When this same dimethyltin dichloride (containing the 5.0% trimethyltin chloride) was heated at 120° C. for 2 hours with 2.6% by weight of stannic chloride, the trimethyltin chloride content was reduced to 0.5% and dimethyltin bis(isooctylthioglycolate) prepared from this material had an $LD_{50}$ rating of 1020.

Example 6

TM–181 was compared with TM–180 as a stabilizer for Geon 103 EP (a polyvinyl chloride medium molecular weight homopolymer).

(1) Oven stability at 360° F.:

| Test formulation: | Parts |
|---|---|
| Geon 103 | 100. |
| Distearyl azelate containing 5% free stearic acid | 0.5. |
| Stabilizer | As indicated. |

| Compound | Phr. | Time in minutes |||||||| 
|---|---|---|---|---|---|---|---|---|---|
| | | 0 | 15 | 30 | 45 | 60 | 75 | 90 | 105 |
| | | Color |||||||| 
| TM–180 | 1.0 | 1 | 4 | 4 | 4 | 4 | 6 | 9 | 10 |
| TM–181 | 1.0 | 1 | 2 | 2 | 2 | 3 | 5 | 8 | 10 |
| | 0.875 | 1 | 2 | 2 | 2 | 4 | 7 | 10 | |
| | 0.8 | 1 | 2 | 2 | 3 | 5 | 9 | 10 | |
| | 0.75 | 1 | 2 | 2 | 3 | 7 | 10 | | |

NOTE.—Color scale 1 to 10.

Conclusion: TM–181 offers superior early color over TM–180 even at significantly lower levels.

(2) Oven stability; twin and single screw extrusion formulations:

| Twin screw: | Parts |
|---|---|
| Geon 103 | 100. |
| K 120 N | 1.5. |
| TiO₂ | 1.0. |
| Ca stearate | 0.4. |
| Advawax 165 | 1.4. |
| Stabilizer | As indicated. |

| Single screw: | Parts |
|---|---|
| Geon 103 | 100. |
| K 120 N | 3.0. |
| TiO₂ | 1.0. |
| Ca stearate | 1.0. |
| Advawax 280 | 0.75. |
| Stabilizer | As indicated. |

K 120 N is a commercial acrylic processing aid, it is a methyl methacrylate polymer (90% methyl methacrylate-10% ethyl acrylate).

Advawax 165 is paraffin wax.

Advawax 280 is ethylene bis(stearamide).

Twin Screw—375° F. Oven

| Stabilizer | Parts | 1st color (min.) | Failure (min.) |
|---|---|---|---|
| TM-180 | 0.40 | 10 | 40 |
| TM-181 | 0.36 | 20 | 50 |

Single Screw—400° F. Oven

| TM-180 | 1.40 | 10 | 25 |
| TM-181 | 1.25 | 15 | 30 |

Conclusion: TM-181 furnishes better color stability than TM-180 to both a single screw and a twin screw type of polyvinyl chloride pipe compound.

(3) Processing stability—Brabender plastograph: Conditions—220° C.; 50 r.p.m., charge 60 grams.

The formulation employed was the twin screw formulation used in Example 6, part 2, with the parts of stabilizer indicated below.

| Stabilizer | | Parts | Fusion time (min.) | Max. torque | Stability time (min.) | Minimum torque |
|---|---|---|---|---|---|---|
| Low level | TM-180 | 0.40 | 2.2 | 2,700 | 3.7 | 1,900 |
| | TM-181 | 0.36 | 1.8 | 3,425 | 5.6 | 1,725 |
| Intermediate level. | TM-180 | 0.60 | 3.8 | 2,400 | 6.1 | 1,600 |
| | TM-181 | 0.53 | 1.7 | 3,950 | 6.9 | 1,725 |
| High level | TM-180 | 0.80 | 1.5 | 3,200 | 8.7 | 1,600 |
| | TM-181 | 0.72 | 1.2 | 3,850 | 9.0 | 1,600 |

Conclusion: TM-181 is clearly superior to TM-180 in processing stability and color stability during processing even at a 10% lower use level. As the total stabilizer level is reduced the advantage shown by TM-181 is more pronounced.

(4) Twin screw extrusion: A series of pipe extrusions were carried out in Linz, Austria on an AGM CT 90/6 conical twin screw extruder using TM-180 and TM-181 in the preparation of 2-inch SDR 21, Type I, Grade I pipe.

Formulation I:                                           Parts
  Geon 103 EP _____ 100
  K 120 N _____ 1.5
  TiO₂ _____ 1.0
  Ca stearate _____ 0.4
  Advawax 165 _____ 1.4
  TM-180 _____ 0.6

Formulation II:
  Geon 103 EP _____ 100
  K 120 N _____ 1.5
  TiO₂ _____ 1.0
  Ca stearate _____ 0.4
  Advawax 165 _____ 1.4
  TM-181 _____ 0.54

| | I | II |
|---|---|---|
| Mixing— | | |
| Time | 6 min., 15 sec. | 6 min., 23 sec. |
| Temperature | 120° C | 120° C. |
| Bulk density | 590 g./liter | 600 g./liter. |
| Pipe quality: | | |
| Acetone | OK | OK. |
| Methylene chloride | OK | OK. |
| Drop impact | OK | OK. |
| Oven (porosity) | None | None. |
| Quick burst (630 p.s.i. or 42 atm. min.) | 52 atm | 53 atm. |
| Output rate | 150 lbs./hr | 170 lbs./hr. |

Conclusion: TM-181 exhibited a higher output rate and excellent overall performance at a 10% lower use level.

(5) Single screw extrusion: TM-181 was evaluated in a commercial impact-modified polyvinyl chloride conduit compound at a 20% lower use level than TM-180. Using a Prodex 3½" 24:1 extruder the compounds were extruded from powder, then subjected to two additional extrusions from regrind. TM-181 performed successfully in this evaluation.

(6) Corrosive properties: Several commercial tin stabilizers are highly acidic in nature, and in fact contained 1.8 to 2.0 chlorine which is readily hydrolyzed, forming HCl.

Steel bars were immersed in TM-181 and one such competitive commercial stabilizers and allowed to stand at room temperature for several days. Severe corrosion occurred on the steel bar in the presence of the competitive stabilizer while the TM-181 exhibited no corrosive tendencies on the steel bar immersed in it. This result is significant since corrosion is a property that potentially can be costly in terms of mixing extruding, metering and additive handling equipment.

Example 7

This example further shows the performance profile for TM-181.

(1) Dynamic processing stability formulation:

Parts
Geon 103 EP _____ 100.0.
K 120 N _____ 2.0.
Chlorinated polyesthylene (CPE) _____ 2.0.
Titanium dioxide _____ 1.5.
Advawax 280 _____ 1.0.
Calcium stearate _____ 1.0.
TM-181 _____ As indicated.
Mill dynamic, 390° F. _____ Brabender, 190° C., 50 r.p.m. 60 grams.

| Phr. | 1st color | Failure | 1st color | Failure |
|---|---|---|---|---|
| 1.6 | 20 minutes | 26 minutes | 12 minutes | 18 minutes. |
| 1.4 | 18 minutes | 24 minutes | 10 minutes | 14 minutes. |

At equal levels TM-181 furnished about 8% greater stability (both early color and ultimate processing stability) than a competitive commercial tin stabilizer. At a 12% lower use level TM-181 furnished equivalent two roll mill dynamic stability and slightly less Brabender stability.

Failure is indicated in the above tests by sticking or bad color or both.

(2) Injection molding of pipe fittings: A comparison was made of TM-181 (1.7 phr.) and TM-180 ((2.0 phr.) stabilized polyvinyl chloride pipe fitting compounds in an HPM reciprocating screw injection molding machine. Pipe fittings containing the TM-181 were whiter than the TM-180 stabilized fittings, which exhibited slight burning near the gates.

(3) Pipe extrusion trial: The performance of TM-181 in a variety of single and twin screw extractors and comparison with TM-180 is illustrated by the following representative extrusion runs.

| Extrusion type | Pipe size (in.) | Stabilizer | Phr. | Output, lbs./hr. | Pipe quality appearance |
|---|---|---|---|---|---|
| APM A/4/80 | 2 | TN-180 | 0.6 | 206 | Good quality. |
| | 2 | TM-181 | 0.5 | 209 | Excellent color. |
| | 2 | TM-181 | 0.4 | 213.5 | Excellent pipe. |
| AGM CT 111/8 | 8 | TM-181 | 0.5 | 530 | Excellent, high gloss. |
| AGM CT 111/8 (thin wall). | 15 | TM-181 | 0.5 | 540 | Excellent. |
| AGM CT 111/8 | 3 | TM-180 | 0.6 | 500+ | Good quality. |
| | 3 | TM-181 | 0.54 | 500+ | Whiter than standard.* |
| | 3 | TM-181 | 0.48 | 500+ | Slightly whiter than standard.* |

*Standard is TM-180.

B. Single Screw Extrusion

| Extruder type | Pipe size (in.) | Stabilizer usage level | Output, lbs./hr. | Pipe quality appearance |
|---|---|---|---|---|
| Predox: | | | | |
| 3½″, 24:1 | 8 | TM-180 standard | 320 | |
| | 8 | TM-181 10% below standard. | 328 | Excellent, whiter than standard. |
| 4½″, 24:1 | 12 | TM-180 standard | 700 | |
| | 12 | TM-181 15% below standard. | 700 | Excellent, whiter than standard. |
| 2½″, 24:1 | 2 | TM-180 standard | 170 | |
| | 2 | TM-181 15% below standard. | 170 | Whiter than standard. |
| Davis Standard: | | | | |
| 3½″, 24:1 | 4 | TM-180 1.0 phr | 386 | Production standard. |
| | 4 | TM-181 0.9 phr | 383 | Equivalent to standard. |
| | 4 | TM-181 0.85 phr | 392 | Do. |
| | 4 | TM-181 0.80 phr | 406 | Do. |

Conclusion: At lower use levels (10-30% lower) TM-181 can provide both higher quality and increased output rates on twin and single screw pipe extrusion lines than TM-180.

Customers have reported (a) that TM-181 is more effective than TM-180 in stabilizing chlorinated PVC at high temperature; (b) that Type I PVC pipe having a 2500 p.s.i. design stress rating has been obtained with TM-181 (normal design stress for Type I PVC pipe is 2000 p.s.i.), and (c) TM-181 can be used in high distortion teleduct (conduit) PVC.

As used in the present specification and claims the isooctyl group is the mixture of isomers produced in the oxo process. This is the normal meaning of "isooctyl" when used with conventional tin stabilizers such as dibutyltin bis(isooctyl thioglycolate) as is set forth in Kirk-Othmer Encyclopedia of Chemical Technology, 1st ed., second supplement (1960), p. 540. A typical commercial mixture of isomeric octyl alcohols used to prepare the isooctyl thioglycolate is shown in Kirk-Othmer on p. 552 and the usage of the term "iso" is explained on pp. 553-554.

As used in the claims the term "$LD_{50}$ of at least 1000" means that the $LD_{50}$ is at least 1000 or greater, e.g. 1000, 1100 or 1380.

The dimethyltin bis(isooctylmercaptoalkanoates) of the invention are compatible with polyvinyl chloride as is evident from the data presented supra and do not cause hazy films.

In place of the dimethyltin bis(isooctylmercaptoalkanoate) there can be employed the corresponding dimethyltin bis(2-ethylhexyl thioglycolate) and dimethyltin bis(2-ethylhexyl-3-mercaptopropionate) as stabilizers for the halogen-containing resins, e.g., polyvinyl chloride. The dimethyltin bis(2-ethylhexyl mercapto-alkanoate) can be prepared in an identical manner to that shown in Example 1, replacing the isooctylthioglycolate by a mole of 2-ethylhexyl thioglycolate (or 1 mole of 2-ethylhexyl-3-mercaptopropionate).

It has now been found that not only the dimethyl compounds prepared and used in Examples 1-7 can be prepared with low toxicity but that also all of the other compounds within Formula I can likewise be prepared with low toxicity by reducing the amount of trimethyltin product in the same manner by preparing the materials either using dimethyltin dichloride of low toxicity due to the reduction in trimethyltin chloride, e.g. as prepared in Example 1, or using dimethyltin oxide of low toxicity due to the reduction in trimethyltin compounds because of preparation of the dimethyltin oxide by the method indicated broadly in Example 2.

The only change in the procedures normally used for the preparation of the compounds of Formula I (which compounds are old per se) is to employ as a basic starting material dimethyltin chloride having a very low amount of trimethyltin chloride. It was not previously recognized that the presence of trimethyltin compounds was the reason for toxicity of dimethyltin compounds.

As shown in Example 5 the amount of trimethyltin chloride present in dimethyltin dichloride is reduced by adding $SnCl_4$ to dimethyltin dichloride. The use of excess $SnCl_4$, e.g. 10% or 20% in the process of Example 5 merely increases the amount of monomethyltin chloride in the dimethyltin dichloride but it further assures the reduction in amount of trimethyltin chloride.

The products of the present invention should have an $LD_{50}$ of at least 1000 when administered orally to rats. This can be accomplished by assuring that the trimethyltin content

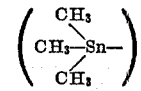

in the dimethyltin compounds of Formula I is so low that not more than 0.75% of the tin as metal is in the form of trimethyltin compounds. Any way which assures that the amount of tin present as trimethyltin compound is not over 0.75% of the total tin as metal in the dimethyltin compound can be used to prepare such compounds. As indicated above the starting materials are preferably made from dimethyltin dichloride treated to reduce the trimethyltin chloride so that not over 0.75% of the tin as metal is present as trimethyltin chloride. Using this starting material (or dimethyltin oxide prepared therefrom) conventional procedures are employed, such as those illustrated in Examples 1-4. Dimethyltin sulfide can be prepared, for example, by reacting 1 mole of dimethyltin dichloride with two moles of sodium sulfide and compounds such as sodium methyl mercaptide or sodium isooctyl mercaptide, for example, can react with the purified dimethyltin dichloride by the conventional procedure to form dimethyltin dimethyl mercaptide or dimethyltin diisooctyl mercaptide. The general reaction procedures are further illustrated in Kirk-Othmer Encyclopedia of Chemical Technology, second supplement volume (1960) pp. 532-533.

In the case of dimethyltin bis(isooctyl thioglycolate) the amount of trimethyltin isooctyl thioglycolate present amounts to 0.5 wt. percent, this amount corresponds to about 0.75% of the total tin present calculated as metal being present as trimethyltin compound.

The amount of trimethyltin compound present can be reduced to zero but is normally reduced to not over 0.15% of the total tin present calculated as metal since the greater the reduction in amount of trimethyltin compound the greater the increase in cost.

What is claimed is:

1. A composition comprising a halogen containing resin selected from the group consisting of chlorinated polyethylene, vinyl halide resin and a vinylidene halide resin stabilized with a stabilizingly effective amount of a dimethyltin bis(octylmercaptoalkanoate) having 2 to 3 carbon atoms in the alkanoate group wherein the octyl is either isooctyl or 2-ethylhexyl, said stabilizer containing not over about 0.5% of the corresponding trimethyltin octylmercaptoalkanoate as an impurity and having an $LD_{50}$ of at least 1000 when administered orally to rats, said compound being insoluble in water.

2. A composition comprising a halogen containing resin selected from the group consisting of chlorinated polyethylene, vinyl halide resin and a vinylidene halide resin stabilized with a stabilizingly effective amount of a compound having the formula

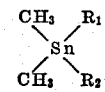

where $R_1$ and $R_2$ are $—S(CH_2)_nCOOR_3$, wherein $R_3$ is a hydrocarbon and $n$ is an integer of 1 to 3 containing not over 0.75% of the tin calculated as metal in the form of trimethyltin compound as an impurity.

3. A composition according to claim 2 wherein the halogen containing resin is a vinyl chloride resin.

4. A composition according to claim 3 wherein the amount of trimethyltin compound present is not over 0.15% of the total tin present in the composition.

5. A composition according to claim 2 wherein the stabilizer is dimethyltin bis(isooctyl thioglycolate).

6. A composition according to claim 5 wherein the halogen containing resin is a vinyl chloride resin.

7. A composition according to claim 6 wherein the vinyl chloride resin contains at least 70% vinyl chloride units by weight.

8. A composition according to claim 7 wherein the vinyl chloride resin is polyvinyl chloride.

9. A composition according to claim 8 wherein the stabilizer is present in an amount of 0.1 to 5% by weight of the resin.

10. A composition according to claim 2 wherein $R_3$ is alkyl, cycloalkyl, alkenyl or benzyl.

11. A composition according to claim 10 wherein $R_3$ is an alkyl of 4 to 12 carbon atoms.

12. A composition according to claim 2 in the form of pipe suitable for use with potable water.

13. A composition according to claim 12 wherein the pipe is rigid polyvinyl chloride pipe.

14. A composition according to claim 13 wherein the dimethyltin compound is dimethyltin bis(isooctyl thioglycolate).

15. A composition comprising a halogen containing resin selected from the group consisting of chlorinated polyethylene, vinyl halide resin and a vinylidene halide resin stabilized with a stabilizingly effective amount of a dimethyltin bis(isooctylmercaptoalkanoate) having 2 to 3 carbon atoms in the alkanoate group, the amount of trimethyltin compound present in the composition being not over 0.75% of the total tin calculated as metal.

16. A composition according to claim 15 wherein the halogen containing resin is a vinyl chloride resin.

17. A composition according to claim 16 wherein the dimethyltin bis(isooctylmercaptoalkanoate) is dimethyltin bis(isooctylthioglycolate).

18. A composition according to claim 16 wherein the tin compounds present consist of a dimethyltin bis(isooctylmercaptoalkanoate), methyltin bis(isooctylalkanoate) and trimethyltin isooctylalkanoate, the alkanoate group in each instance having 2 to 3 carbon atoms.

References Cited

UNITED STATES PATENTS

| | | | |
|---|---|---|---|
| 2,832,751 | 4/1958 | Weinberg et al. | 260—45.75 |
| 3,640,947 | 2/1972 | Gloskey | 260—45.75 |
| 3,496,201 | 2/1970 | Tahara et al. | 260—429.7 |
| 3,466,311 | 9/1969 | Mizuno et al. | 260—429.7 |

OTHER REFERENCES

Journal of Applied Chemistry, vol. 4, pp. 314–318, June 1954.

DONALD E. CZAJA, Primary Examiner

V. P. HOKE, Assistant Examiner

UNITED STATES PATENT OFFICE
CERTIFICATE OF CORRECTION

Patent No. 3,810,868           Dated May 7, 1974

Inventor(s) Lewis B. Weisfeld and Robert C. Witman

It is certified that error appears in the above-identified patent and that said Letters Patent are hereby corrected as shown below:

Claim 18, Column 16

Line 13, change "methyltin bis(isooctylalkano-" to read --methyltin tris(isooctylmercaptoalkano- --.

Line 14, change "trimethyltin isooctylalkanoate" to read --trimethyltin isooctylmercaptoalkanoate--.

Signed and Sealed this

Thirteenth Day of July 1976

[SEAL]

Attest:

RUTH C. MASON
*Attesting Officer*

C. MARSHALL DANN
*Commissioner of Patents and Trademarks*